United States Patent
Gonion

(10) Patent No.: US 9,335,997 B2
(45) Date of Patent: *May 10, 2016

(54) PROCESSING VECTORS USING A WRAPPING ROTATE PREVIOUS INSTRUCTION IN THE MACROSCALAR ARCHITECTURE

(71) Applicant: Apple Inc., Cupertino, CA (US)

(72) Inventor: Jeffry E. Gonion, Campbell, CA (US)

(73) Assignee: Apple Inc., Cupertino, CA (US)

(*) Notice: Subject to any disclaimer, the term of this patent is extended or adjusted under 35 U.S.C. 154(b) by 806 days.

This patent is subject to a terminal disclaimer.

(21) Appl. No.: 13/630,596

(22) Filed: Sep. 28, 2012

(65) Prior Publication Data

US 2013/0024651 A1    Jan. 24, 2013

Related U.S. Application Data

(63) Continuation-in-part of application No. 12/495,643, filed on Jun. 30, 2009, now Pat. No. 8,356,154.

(60) Provisional application No. 61/089,251, filed on Aug. 15, 2008.

(51) Int. Cl.

| | |
|---|---|
| *G06F 15/00* | (2006.01) |
| *G06F 7/38* | (2006.01) |
| *G06F 9/00* | (2006.01) |
| *G06F 9/44* | (2006.01) |
| *G06F 9/30* | (2006.01) |
| *G06F 9/45* | (2006.01) |

(52) U.S. Cl.
CPC ............ *G06F 9/30036* (2013.01); *G06F 8/441* (2013.01); *G06F 9/30032* (2013.01); *G06F 9/30072* (2013.01)

(58) Field of Classification Search
None
See application file for complete search history.

(56) References Cited

U.S. PATENT DOCUMENTS

| | | |
|---|---|---|
| 4,873,630 A | 10/1989 | Rusterholz et al. |
| 4,890,220 A | 12/1989 | Nakagawa et al. |
| 5,151,991 A | 9/1992 | Iwasawa et al. |
| 5,228,131 A | 7/1993 | Ueda et al. |
| 5,381,536 A | 1/1995 | Phelps et al. |
| 5,430,884 A | 7/1995 | Beard et al. |
| 5,481,746 A | 1/1996 | Schiffleger et al. |
| 5,537,562 A | 7/1996 | Gallup et al. |
| 5,548,768 A | 8/1996 | Gallup et al. |
| 5,553,309 A | 9/1996 | Asai et al. |
| 5,680,338 A | 10/1997 | Agarwal et al. |
| 5,727,229 A | 3/1998 | Kan et al. |
| 5,781,752 A | 7/1998 | Moshovos et al. |
| 5,953,241 A | 9/1999 | Hansen et al. |
| 5,991,785 A | 11/1999 | Alidina et al. |
| 6,098,162 A | 8/2000 | Schiffleger et al. |

(Continued)

OTHER PUBLICATIONS

Scale, et al., "AltiVec Extension to PowerPC accelerates media processing," Micro, IEEE vol. 20, Issue 2, Aug. 2002, pp. 85-95.

*Primary Examiner* — George Giroux
(74) *Attorney, Agent, or Firm* — Anthony M. Petro; Meyertons, Hood, Kivlin, Kowert & Goetzel, P.C.

(57) ABSTRACT

Embodiments of a system and a method in which a processor may execute instructions that cause the processor to receive an operand vector, a selection vector, and a control vector are disclosed. The executed instructions may also cause the processor to perform a wrapping rotate previous operation dependent upon the input vectors.

18 Claims, 10 Drawing Sheets

(56) References Cited

U.S. PATENT DOCUMENTS

| | | |
|---|---|---|
| 6,115,808 A | 9/2000 | Arora |
| 6,295,597 B1 | 9/2001 | Resnick et al. |
| 6,295,599 B1 | 9/2001 | Hansen et al. |
| 6,301,706 B1 | 10/2001 | Maslennikov et al. |
| 6,308,250 B1 | 10/2001 | Klausler |
| 6,324,638 B1 | 11/2001 | Elmer et al. |
| 6,470,440 B1 | 10/2002 | Nguyen et al. |
| 6,542,918 B1 | 4/2003 | Vishkin |
| 6,584,482 B1 | 6/2003 | Hansen et al. |
| 6,643,765 B1 | 11/2003 | Hansen et al. |
| 6,725,356 B2 | 4/2004 | Hansen et al. |
| 6,959,378 B2 | 10/2005 | Nickolls et al. |
| 6,988,183 B1 | 1/2006 | Wong |
| 7,213,131 B2 | 5/2007 | Hansen et al. |
| 7,216,217 B2 | 5/2007 | Hansen et al. |
| 7,260,708 B2 | 8/2007 | Hansen et al. |
| 7,301,541 B2 | 11/2007 | Hansen et al. |
| 7,307,453 B1 | 12/2007 | Maitland et al. |
| 7,353,367 B2 | 4/2008 | Hansen et al. |
| 7,363,574 B1 | 4/2008 | Maitland et al. |
| 7,430,655 B2 | 9/2008 | Hansen et al. |
| 7,464,252 B2 | 12/2008 | Hansen et al. |
| 7,509,366 B2 | 3/2009 | Hansen |
| 7,516,308 B2 | 4/2009 | Hansen et al. |
| 7,571,302 B1 | 8/2009 | Chen et al. |
| 7,653,806 B2 | 1/2010 | Hansen et al. |
| 7,660,972 B2 | 2/2010 | Hansen et al. |
| 7,660,973 B2 | 2/2010 | Hansen et al. |
| 7,725,518 B1 | 5/2010 | Le Grand |
| 7,725,520 B2 | 5/2010 | Sakaguchi et al. |
| 7,730,287 B2 | 6/2010 | Hansen et al. |
| 7,873,812 B1 | 1/2011 | Mimar |
| 7,900,025 B2 | 3/2011 | Gschwind |
| 8,010,953 B2 | 8/2011 | Gschwind |
| 8,078,847 B2 | 12/2011 | Gonion et al. |
| 8,131,979 B2 | 3/2012 | Gonion et al. |
| 8,243,100 B2 | 8/2012 | Krithivasan et al. |
| 8,261,043 B2 | 9/2012 | Inoue et al. |
| 8,364,938 B2 | 1/2013 | Gonion et al. |
| 2001/0032308 A1 | 10/2001 | Grochowski et al. |
| 2003/0159017 A1 | 8/2003 | Barlow et al. |
| 2003/0167460 A1 | 9/2003 | Desai et al. |
| 2004/0044882 A1 | 3/2004 | Asaad et al. |
| 2004/0073773 A1* | 4/2004 | Demjanenko .................. 712/7 |
| 2005/0240644 A1 | 10/2005 | Van Berkel et al. |
| 2006/0004996 A1 | 1/2006 | Gonion |
| 2006/0041610 A1 | 2/2006 | Hokenek et al. |
| 2006/0168432 A1 | 7/2006 | Caprioli et al. |
| 2008/0317150 A1 | 12/2008 | Alexander et al. |
| 2009/0089542 A1 | 4/2009 | Laine et al. |
| 2009/0132878 A1 | 5/2009 | Garland et al. |
| 2009/0150657 A1 | 6/2009 | Gschwind et al. |
| 2009/0172348 A1 | 7/2009 | Cavin |
| 2009/0172360 A1 | 7/2009 | Hikichi |
| 2010/0042789 A1 | 2/2010 | Gonion et al. |
| 2010/0042807 A1 | 2/2010 | Gonion et al. |
| 2010/0042815 A1 | 2/2010 | Gonion et al. |
| 2010/0042816 A1 | 2/2010 | Gonion et al. |
| 2010/0042817 A1 | 2/2010 | Gonion et al. |
| 2010/0042818 A1 | 2/2010 | Gonion et al. |
| 2010/0049950 A1 | 2/2010 | Gonion et al. |
| 2010/0049951 A1 | 2/2010 | Gonion et al. |
| 2010/0058037 A1 | 3/2010 | Gonion et al. |
| 2010/0095087 A1 | 4/2010 | Eichenberger et al. |
| 2010/0115233 A1 | 5/2010 | Brewer et al. |
| 2010/0274988 A1 | 10/2010 | Mimar |
| 2010/0325398 A1 | 12/2010 | Gonion et al. |
| 2010/0325399 A1 | 12/2010 | Gonion et al. |
| 2010/0325483 A1 | 12/2010 | Gonion et al. |
| 2011/0035567 A1 | 2/2011 | Gonion et al. |
| 2011/0035568 A1 | 2/2011 | Gonion et al. |
| 2011/0071136 A1 | 3/2011 | Haddach et al. |
| 2011/0093681 A1 | 4/2011 | Gonion et al. |
| 2011/0113217 A1 | 5/2011 | Gonion et al. |
| 2011/0276782 A1 | 11/2011 | Gonion et al. |
| 2011/0283092 A1 | 11/2011 | Gonion |
| 2012/0060020 A1 | 3/2012 | Gonion et al. |
| 2012/0204007 A1 | 8/2012 | Reid |

\* cited by examiner

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

*FIG. 4A*

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

*FIG. 4B*

SOURCE CODE

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

FIG. 5A

VECTORIZED CODE

```
r = 0 ;
s = 0 ;
x = VectorIndex (0,1) ;
    goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

FIG. 5B

EXAMPLE 2A
VECTORIZED
(NON-SPECULATIVE)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1,  kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

FIG. 6A

EXAMPLE 2B
VECTORIZED
(SPECULATIVE)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1,  kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

FIG. 6B

EXAMPLE 3
VECTORIZED

```
        x = VectorIndex (0,1) ;
        goto Loop1Tail ;
Loop1:
    ~p0; r = VectorReadInt(C,x);
    ~p0; s = VectorReadInt (D, x) ;
    i1 = CheckHazardP(r,x,p0);
    i2 = CheckHazardP(s,x,p0);
    i3 = VectorMax(i1,i2);
    p4 = 0 ;
Loop2:
    ~p0; p4 = GeneratePredicates (p4, i3) ;
    ~p4; t1 = VectorReadInt(A,r) ;
    ~p4; t2 = VectorReadInt(A,s);
    ~p4; t3 = t1 + t2 ;
    ~p4; VectorWriteInt(A,x,t3);
    ~p0; if (!CARRY( )) goto Loop2;
    x += VECLEN;
Loop1Tail:
    p0 = (x < KSIZE) ;
    if ( FIRST (p0) ) goto Loop1 ;
```

FIG. 7

EXAMPLE 4
VECTORIZED

```
        x = VectorIndex (0,1) ;
        goto Loop1Tail ;
Loop1:
    j = PropagatePriorF(j,p0);
    ~p0; f = VectorReadInt(A,x);
    ~p0; g = VectorReadInt (B, x) ;
    !p0; p1 = (f < FACTOR);
    !p0; p2 = (g < FACTOR);
    ~p1; h = VectorReadInt(C,x);
    ~p2; i = VectorReadInt(D,x);
    !p1; ix = CheckHazardP(h,i,p2);
    p3 = 0 ;
Loop2:
    p3 = GeneratePredicates (p3, ix) ;
    !p3; p4 = p1 + 0;
    !p3; p5 = p2 + 0;
    ~p4; j = VectorReadInt(E,h);
    j = CopyPropagate(j,j,p4);
    ~p5; VectorWriteInt(E,i,j);
    ~p0; if (!LAST(p3)) goto Loop2;
    x += VECLEN;
Loop1Tail:
    p0 = (x < KSIZE) ;
    if ( FIRST (p0) ) goto Loop1 ;
```

FIG. 8

PROCESSING VECTORS USING A WRAPPING ROTATE PREVIOUS INSTRUCTION IN THE MACROSCALAR ARCHITECTURE

PRIORITY CLAIM

This application is a continuation-in-part of co-pending U.S. patent application Ser. No. 12/495,643, filed on Jun. 30, 2009, which claims priority to U.S. Provisional Patent Application No. 61/089,251, filed Aug. 15, 2008.

BACKGROUND

1. Technical Field

This disclosure relates to vector processing, and more particularly to the processing of particular vector instructions that perform certain arithmetic and logical operations.

2. Description of the Related Art

In a conventional vector processor that exploits data-level parallelism (DLP), vectorization of loops in program code may affect the widespread adoption of DLP processors. In a typical program, a large portion of execution time is spent in loops. Unfortunately, many of these loops have characteristics that render them unvectorizable in conventional DLP processors. Thus, the performance benefits gained from attempting to vectorize program code can be limited.

One obstacle to vectorizing loops in program code in conventional systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY OF THE EMBODIMENTS

Various embodiments of recurrent wrapping rotate previous instructions are disclosed. Broadly speaking, a system and method are contemplated in which a processor may execute instructions that cause the processor to receive a basis vector, an operand vector, a selection vector, and a control vector. Each of the basis vector, the operand vector, the selection vector, the control vector, and the result vector may include a respective number of elements that occupy ordered element positions.

In one embodiment, in response to a determination that both the selection vector and the control vector are active at a given element position, a processor may be configured to set the given element position of the result vector to an element of the operand vector immediately preceding the given element position of the result vector. In some implementations, the processor may also be configured to receive a basis vector, evaluate the selection vector to identify a first active element position of the selection vector, and select an element of the basis vector as a basis value dependent upon the first active element position.

In one specific implementation, dependent upon a determination that the selection vector and the control vector are both inactive at the given element position and are both active at no element position prior to the given element position, the processor may be further configured to copy an element of the basis vector at the given element position to the given element position of the result vector. In a further specific implementation, dependent upon a determination that the given element position of the control vector or the selection vector is inactive, and that for at least one element position prior to the given element position, the selection vector and the control vector are both active, the processor may be further configured to set the given element position of the result vector to a value of the operand vector at a position immediately prior to a closest prior element position relative to the given element position for which the selection vector and the control vector are both active.

In yet another specific implementation, dependent upon a determination that the selection vector is active at the given element position, that the given element position of the control vector is inactive, and that for no element positions prior to the given element position are the selection vector and the control vector both active, the processor may be further configured to set the given element position of the result vector to a value of the basis vector at a closest prior element position relative to the given element position for which the selection vector and the control vector are both inactive.

BRIEF DESCRIPTION OF THE DRAWINGS

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

FIG. 7 is a diagram illustrating one embodiment of vectorized program code.

FIG. 8 is a diagram illustrating another embodiment of vectorized program code.

Figure 1:
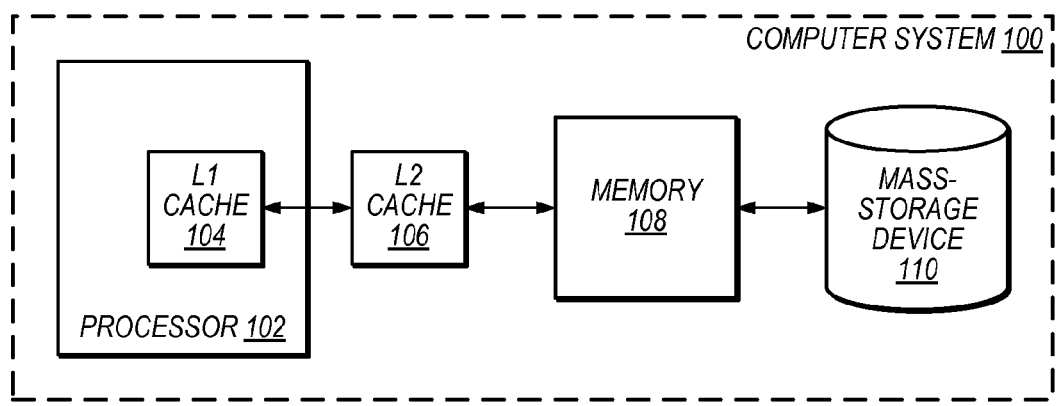
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure.

Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 106, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 106, and L1 cache 104 are all examples of non-transitory computer readable storage devices.

Processor

Figure 2:
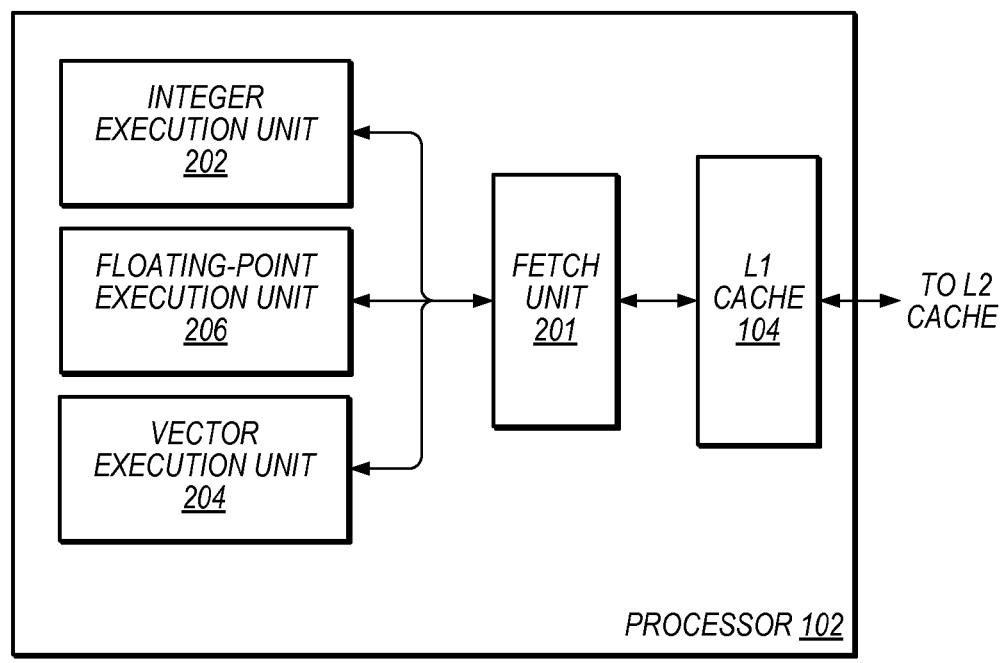
FIG. 2 is a block diagram illustrating additional details of an embodiment of the processor shown in FIG. 1.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, an integer execution unit 202, a floating-point execution unit 206, and a vector execution unit 204. It is noted that integer execution unit 202, floating-point execution unit 206, and vector execution unit 204 as a group may be interchangeably referred to as "the execution units."

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Any suitable configurations may be employed for integer execution unit 202 and floating-point execution unit 206, depending on the particular configuration of architectural and performance parameters governing a particular processor design. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations station, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, doublewords, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

The vector execution unit 204 may, in various embodiments, include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation (i.e., instruction, etc.) may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Figure 3:
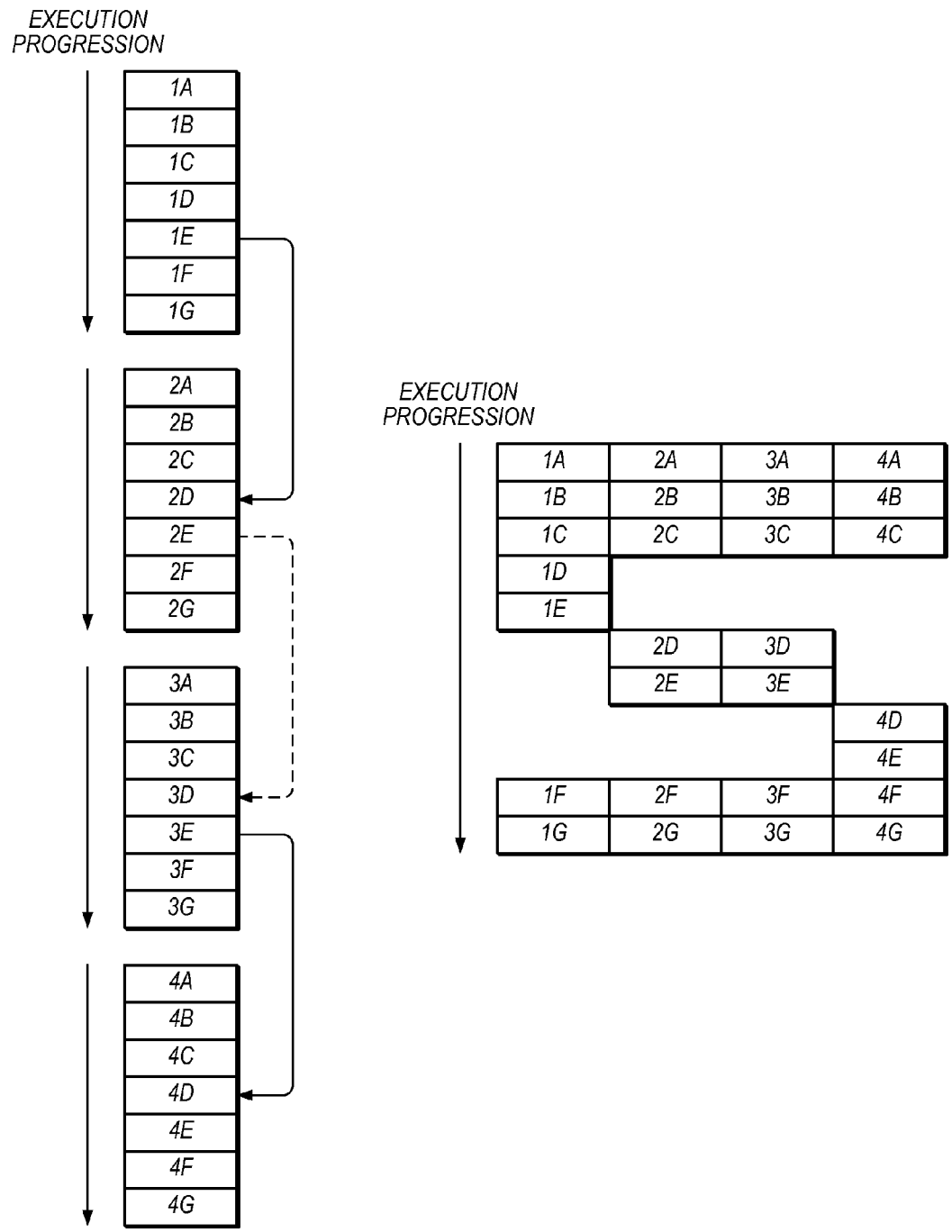
FIG. 3 is a diagram illustrating an example parallelization of a program code loop.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.
Notation In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

! p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ...; // Also LAST( ), ANY( ), ALL( ),
CARRY( ), ABOVE( ), or NONE( ), (where ANY( ) ==
!NONE( ))
```

The preceding instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

Program Code Loop

```
r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); //x={0 1 2 3 4 5 6 7}
    dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| | | |
|---|---|---|
| Entry: | dest = | {8 9 A B C D E F} |
| | src = | {1 2 3 4 5 6 7 8} |
| | pred = | {0 0 1 1 0 0 1 0} |
| Exit: | dest = | {8 9 A B 4 4 E 7} | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| | | |
|---|---|---|
| Entry: | src = | {1 2 3 4 5 6 7 8} |
| | pred = | {1 0 1 1 0 0 1 0} |
| Exit: | dest = | {8 2 2 2 5 6 6 8} | dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.
kFF—Implies a loop-carried dependency from an iteration for which the predicate is false, to the subsequent iteration for which the value of the predicate is false.
kFT—Implies a loop-carried dependency from an iteration for which the predicate is false, to the subsequent iteration for which the value of the predicate is true.
kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

| | |
|---|---|
| p1 = (t < FACTOR); | // p1 = {00001100} |
| p2 = ConditionalStop(p1, kTF\|kFT); | // p2 = {00004060} |

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

| | | |
|---|---|---|
| Entry Conditions: | // i2 = | {0 0 0 0 4 0 6 0} |
| p2 = 0; | // p2 = | {0 0 0 0 0 0 0 0} |
| Loop2: | | |
| p2 = GeneratePredicates(p2,i2); | // p2' = | {1 1 1 1 0 0 0 0} |
| CF = 0, ZF = 0 | | |
| if(!PLAST( )) goto Loop2 | // p2'' = | {0 0 0 0 1 1 0 0} |
| CF = 0, ZF = 0 | // p2''' = | {0 0 0 0 0 0 1 1} |
| CF = 1, ZF = 0 | | |

From an initialized predicate p2 of all zeros, GeneratePredicates generates new instances of p2 that partition subsequent vector calculations into three sub-vectors (i.e., p', p'', and p'''). This enables the hardware to process the vector in groups that avoid violating the data dependencies of the loop.

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j = 0;
for (x=0; x<KSIZE; ++x)
{
    if (A[x] < FACTOR)
    {
        j = A[x+j];
    }
    B[x] = j;
}
```

Example 2B

Program Code Loop 2

```
j = 0;
for (x=0; x<KSIZE; ++x)
{
    if (A[x+j] < FACTOR)
    {
        j = A[x];
    }
    B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

| Entry: | pred = | {0 0 1 0 1 0 0 0} |
| Exit:  | dest = | {0 0 0 0 0 1 1 1} |

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations.

However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the ConditionalStop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

Program Code Loop 3

```
for (x=0; x<KSIZE; ++x)
{
    r = C[x];
    s = D[x];
    A[x] = A[r] + A[s];
}
```

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluate write-after-read, read-after-write, and write-after-write memory hazards.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

| Entry: | first =  | {2 3 4 5 6 7 8 9} |
|        | second = | {8 7 6 5 4 3 2 1} |
|        | pred =   | {1 1 1 1 1 1 1 1} |
| Exit:  | dest =   | {0 0 0 0 3 2 1 0} |

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

| Entry Conditions: | //DIV = | {0 0 0 0 3 2 1 0} |
|                   | // p2 = | {0 0 0 0 0 0 0 0} |
| p2 = GeneratePredicates(p2,DIV); | // p2 = | {1 1 1 1 0 0 0 0} |
| P2 = GeneratePredicates(p2,DIV) | // p2 = | {0 0 0 0 1 1 1 1} |

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
    if(DIV[x] in List)
        Break from loop;
    else if(DIV[x]>0)
        Append <x> to List;
}
```

The vector may safely be processed in parallel over the interval [STARTPOS,x), where x is the position where DIV [x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0);   //i2 = {0 0 2 0 2 4 0 0}
i3 = CheckHazardP(b,c,p0);   //i3 = {0 0 1 3 3 0 0 0}
ix = VectorMax(i2,i3);       //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 7 is a diagram illustrating one embodiment of example vectorized program code. More particularly, the code sample shown in FIG. 7 is a vectorized version of the code in Example 3 (as presented above). Referring to FIG. 7, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 7, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 8 a diagram illustrating one embodiment of example vectorized program code is shown. More particularly, the code sample shown in FIG. 8 is a vectorized Macroscalar version of the code in Example 4 (as presented above).

Example 4

Program Code Loop 4

```
j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 8, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above.

INSTRUCTION DEFINITIONS

The following sections include additional example instructions used in various embodiments of the Macroscalar architecture. The example instructions demonstrate various concepts used in implementing the Macroscalar architecture and therefore do not comprise a complete list of the possible instructions. Accordingly, it is contemplated that these concepts may be implemented using different arrangements or types of instructions without departing from the spirit of the described embodiments.

Unlike conventional single-instruction-multiple-data (SIMD) coding, in some embodiments, Macroscalar code can combine vector variables with scalar registers or immediate values. Thus, in these embodiments, Macroscalar instructions can directly reference scalar registers and immediate values without making unnecessary vector copies of them. As such, this may help avoid unnecessary vector-register pressure within a loop because more vector registers may be available rather than being required for making vector copies of scalars or immediate values.

The instructions are described using a signed-integer data type. However, in alternative embodiments, other data types or formats may be used. Moreover, although Macroscalar instructions may take vector, scalar, or immediate arguments in practice, only vector arguments are shown here to avoid redundancy.

The descriptions of the instructions reference vector elements with a zero-based numbering system (i.e., element "0" is the first element). However, as mentioned above, certain instructions, such as those involved in the processing of DIVs, express dependencies using 1-based element numbering, even though they are actually implemented using 0-based element numbering. Because of this, care should be taken to avoid confusing the language that the results are expressed in from the language used to implement the instructions.

For the purposes of discussion, the vector data type is defined as a C++ class containing an array v[ ] of elements that comprise the vector. Within these descriptions, as above, the variable VECLEN indicates the size of the vector. In some embodiments, VECLEN may be a constant.

Running and Wrapping Instructions

When vectorizing loops, it is common to encounter expressions that reference a value from the same expression in a previous iteration of the loop. In software, the required calculation can only be performed by iteration across the vector, destroying parallelism. However, this serialization can be avoided in expressions that satisfy certain mathematical properties. For commonly-used expressions that meet the above criteria, hardware is able to calculate a full vector of results without iteration or serialization that software would require. For example, consider the loop in code example 5 below.

Example 5

Program Code Loop 5

```
for (x=0; x<lim; ++x)
{
    if (A[x] == K)
        y = -y;
    B[x] = C[x] + y;
}
```

The specified conditional recurrence operation shown in the above code may be implemented using instructions in the Macroscalar architecture. More particularly, the conditional recurrence operations may be implemented in what are generally referred to as running instructions and wrapping instructions. In some embodiments, the running and wrapping instructions operate by conditionally performing the specified recurrent operation on elements of a vector in ascending order, corresponding to a series of iterations of a scalar version of the operation. However, in other embodiments and as described further below, the execution of the instruction may not necessarily iterate, but may instead operate in parallel to process a vector. It is noted that the specific arithmetic operation shown in program loop 5 (i.e., negation) may be replaced by any type of operation as desired.

In addition, as described further below, the running and wrapping instructions include both an 'A' variant and a 'B' variant. In the 'A' variant instructions, specific operations are performed after a result or intermediate value is stored in a destination vector, and in the 'B' variant, specific operations are performed before the result or the intermediate value is stored in the destination vector.

Further, in some embodiments, the instruction destinations (e.g., result or destination vector) may be explicitly specified, in which case they may be independent of the input operands, or they may be implicitly specified by reusing and overwriting one or more of the input operands. However, in yet other embodiments, the instructions may have an implicit destination that is distinct from the input operands. For example, a special result register that the instruction always writes into may be used. In other words, some embodiments of the Running instructions may specify dst in the header but do not reference dst in the code. Accordingly, in some embodiments, r may be written to dst while in other embodiments, dst may be omitted and r may instead be written to src1 (or, equivalently, src2), as desired. Thus in the example execution results shown below, the results may be written to a vector such as a. In some cases, vector a may be explicitly identified as the input vector that was overwritten with the result, while in other cases a may be a destination vector.

It is noted that in the embodiments of the Running and Wrapping instructions illustrated in following code examples, element positions are processed in a sequential fashion. However, in other embodiments, some or all of the element positions may actually be processed in parallel. That is, although the code examples depict iterative operation in order to simplify their explanation, any given hardware implementation of a particular instruction may be configured to concurrently operate on some or all element positions instead of iteratively operating on a single element position at a time. For example, in one embodiment of the RunSumA instruction below, duplicate adder hardware may be employed so that all previous element positions may be added simultaneously. (As an example, in a four-element machine, a two-input adder might be provided to compute the sum of the first two elements, and distinct three- and four-input adders might be provided to compute the sum of the first three and four elements concurrently.) Alternatively, partial concurrency may be achieved by operating on groups of elements rather than all elements concurrently, which may provide better performance than purely sequential operation with less hardware cost than fully concurrent operation. The following code and execution examples for the Running and Wrapping instructions are not intended to limit the possible combinations of software and hardware that may be used to implement the running instructions, but merely to illustrate possible embodiments.

In the code examples that follow, predication may be communicated to the instructions via the vectors: p and gp. In addition, in the Running instructions, a scalar predication mode, designated Z/M, is used to indicate the effect of the gp vector on the result of the instruction. In some embodiments, the predication mode may be encoded by the instruction, for example as part of the opcode or an encoded field within the instruction. The vector p is the predicate vector that determines which elements participate in the operation being performed by the instruction. As discussed in greater detail below, the gp vector has a different use in the Running instructions than in the Wrapping instructions. In the Running instructions, the gp vector is a predicate that will affect the instruction and/or the assignment of the result vector. More particularly, if an instruction is not predicated, then as above, all elements of the gp vector may be set to a 1. When the instruction is predicated by gp, the mode Z/M indicates whether gp functions in one of a predication or a zeroing capacity. More particularly, if a given element in gp is set to 0, and the Z/M mode indicates that zeroing should be performed, then instruction operation is not performed, and the corresponding input vector element is zeroed. In contrast, if the gp element is set to 0, and the Z/M indicates that predication should be performed, then the corresponding input vector element may either be copied to the result vector, or in embodiments in which the input vector is used as the result vector, the input vector element may be left unaffected. This operation is described in more detail in reference to the specific program code EXAMPLE 6, as well as in the specific execution results, below. In the execution results below, the predication mode is indicated within the instruction mnemonic by using the suffixes Z and M for zeroing and predication, respectively. However, in the Wrapping instructions, the gp vector may be used to determine to select which element of the input vector will be the basis value. This operation is described in more detail in reference to the specific program code EXAMPLE 12, below.

It is noted that in some embodiments, the basis value may be implied, and an explicit indication of the basis via the gp vector may correspondingly be omitted. For example, if the basis is not explicitly indicated, the basis value may be assumed to come from a default element position, or may be assumed to have a default initial value (such as, e.g., zero). Also, in some embodiments, the predication/zeroing effect of the gp vector for the Running instructions may be replaced by a basis selection function for the Wrapping instructions, and predication/zeroing may not be available for the latter. In other embodiments, the Wrapping instructions may be configured to receive an additional operand so that both basis selection and predication/zeroing may be performed.

In the following examples, the Running instructions operate by conditionally performing the specified operation on elements of a vector in ascending order, corresponding to a series of iterations of a scalar version of the operation. The Wrapping instructions perform a similar operation. More particularly, as mentioned above in regard to the Wrapping instructions, in addition to being used as a predicate vector, the gp vector selects the initial or basis value for the operation being performed, and as described further below, if the first element position of the gp vector is active, then the basis value is selected from the last element of the input vector. Further, the Running instructions may require additional program code to maintain basis values, which is not necessary for the Wrapping instructions. For example, the Running instructions may require additional code (e.g., the PRIORF instruction in each pass of the loop in EXAMPLE 5A) to set-up and maintain the propagation of data across passes of the vectorized loop. The PRIORF instruction may propagate values from an input vector, as determined by active elements in p3, into selected elements in the destination. These additional instructions access all elements of the vector, and are wasteful from a power standpoint. Thus, as shown in EXAMPLE 5B, the PRIORF instruction is not used before the Wrapping instruction.

Example 5A

Program Code Using PRIORF Prior to Using RunSumB

```
void AlgTest3(int *a, int *b) // Algorithm using
RunSum
{
    int j = 0;
    PredV p3,p2,p4;
    Vec s1,s5,s6;
    p2 = VecPTrue( );
    s1 = VecU32IndexIIZ(p2, 0, 1);
    p3 = VecS32CmpLTVSZ(p2, s1, KSIZE);
    s5 = VecU32SplatSZ(p2, j);
    while (VecTFirst(p2, p3) != 0)
    {
        s5 = VecU32PriorFVM(s5, p3, s5, p3);
        s6 = VecU32Read4SVZ(p3, unsigned(a), s1);
        p4 = VecU32CmpLTVSZ(p3, s6, FACTOR);
        s5 = VecU32RunSumBVVM(s5,p3,s5,s6,p4);
        VecU32Write4SVZ(p3, unsigned(b), s1, s5);
        s1 = VecU32AddVL1V(s1);
        p3 = VecS32CmpLTVSZ(p2, s1, KSIZE);
    }
    Return;
}
```

Example 5B

Program Code Using WAddB

```
void AlgTest2(int *a, int *b) // Algorithm using WAdd
{
    int j = 0;
    PredV p3,p2,p4;
    Vec s1,s5,s6;
    p2 = VecPTrue( );
    s1 = VecU32IndexIIZ(p2, 0, 1);
    p3 = VecS32CmpLTVSZ(p2, s1, KSIZE);
    s5 = VecU32SplatSZ(p2, j);
    while (VecTFirst(p2, p3) != 0)
    {
        s6 = VecU32Read4SVZ(p3, unsigned(a), s1);
        p4 = VecU32CmpLTVSZ(p3, s6, FACTOR);
        s5 = VecU32WAddBVV(p3,s5,s6,p4);
        VecU32Write4SVZ(p3, unsigned(b), s1, s5);
        s1 = VecU32AddVL1V(s1);
        p3 = VecS32CmpLTVSZ(p2, s1, KSIZE);
    }
    return;
}
```

It is noted that the following code examples are merely illustrative examples and that, in some embodiments, the instructions may be implemented in hardware, software, or a combination thereof. For example, in some embodiments, the functionality expressed by the code example for a given instruction may be implemented entirely by hardware control logic and/or iterative state machines that are not programmer visible. Alternatively, the given instruction may be implemented using microcode that is similarly not programmer visible. Whether implemented entirely in hardware or via microcode, the given instruction may be implemented in an atomic fashion (e.g., such that the given instruction must complete execution on all relevant vector elements without interruption) or in an interruptible fashion (e.g., such that the given instruction may be interrupted before all relevant vector elements have been processed and may gracefully be resumed or restarted without resulting in inconsistent processor behavior). In some embodiments, the functionality expressed by the code example for a given instruction may be implemented by other programmer-visible instructions defined within an instruction set architecture. For example, the given instruction may be implemented as an emulated instruction that is not directly executed, but instead causes a defined set of other programmer-visible instructions (e.g., defined as part of a routine, fault handler, or similar code construct) to be executed, for example by raising a fault or otherwise passing control to the instructions that perform the emulation.

Copy Propagate

In some embodiments, conditional recurrent bitwise copy operations may be implemented using instructions in the Macroscalar architecture. More particularly, as described further below, copy propagate (CopyP) may be implemented.

The CopyP instruction operates by conditionally performing the specified recurrent shift left operation on elements of a vector in ascending order, corresponding to a series of iterations of a scalar version of the operation. One embodiment of the CopyP instruction is shown in code example 6. In this embodiment, the CopyP performs a bitwise copy of the active elements from input vector src2 to destination vector dst. Element positions that are not copied receive the propagate value from input vector src1 or a zero value dependent upon the state of the predicate flag.

Example 6

Program Code CopyP

```
Vec CopyP(Vec dst, PredV gp, Vec src1, Vec src2, PredV p)
{
    Vector r;
    int x;
    int y=0;
    for(x=0;x<VECLEN;++x)
    {
        if(gp.v[x] && p.v[x])
            break;
        else if(gp.v[x])
            r.v[x] = src1.v[y=x];
        else
            r.v[x] = dst.v[y=x];
    }
    for(; x<VECLEN; ++x)
    {
        if(gp.v[x] && p.v[x])
            r.v[x] = src2.v[y=x];
        if(gp.v[x])
            r.v[x] = src2.v[y];
        else
            r.v[x] = dst.v[x];
    }
    return(r);
}
```

An example of the CopyP instruction operating with predication is shown below in execution example 7. Referring to the example, at element position one, predicate gp and predicate p are both 0, resulting in the value of input vector a at element position one (9) being copied to element position one of the destination vector r. Moving to element position two, predicate p remains 0, resulting in the value of input vector a at element position two being copied into element position two of destination vector r.

Turning to element position three, both predicate gp and predicate p are 1, resulting in the value of input vector b at element position three (3) being copied into the corresponding element position of destination vector r. At element position four, both predicates are again 1, resulting in element position four of input vector b (4) being copied into element position four of destination vector r.

Moving to element position five, predicate gp is 1 and predicate p is 0. This results in the value at the preceding element position of destination vector r (4) being copied into element position five of destination vector r. The same situation occurs at element position six.

At element position seven, both predicates are 1, so the value at element position seven of input vector b (7) is copied to element position seven of destination vector r. At element position eight, predicate p is 0, so the value at element position seven of destination vector r is copied to element position eight of destination vector r. It is noted that in the preceding description of execution example 2, element positions were processed in a sequential fashion. In other embodiments, the various element positions may be processed in a different order or in parallel.

Example 7

Execution of CopyP with Predication

```
a = CopyP(a,gp,a,b,p);
On Entry:   gp =  {0 1 1 1 1 1 1 1}
             p =  {0 0 1 1 0 0 1 0}
             a =  {9 9 9 9 9 9 9 9}
             b =  {1 2 3 4 5 6 7 8}
On Exit:    a =  {9 9 3 4 4 4 7 7}
```

An example of the CopyP instruction operating with zeroing is shown below in execution example 8. The execution with zeroing is similar to the execution with predication as described above in reference to execution example 7. When functioning in zeroing mode, however, the CopyP instruction copies a zero into the element position of destination vector r corresponding to element positions of predicate gp that contain a 0 value. For example, at element position one of execution example 8, the predicate gp is 0, resulting in a 0 being stored in element position one of destination vector r.

Example 8

Execution of CopyP with Zeroing

```
a = CopyP(a,gp,a,b,p);
On Entry:   gp =  {0 1 1 1 1 1 1 1}
             p =  {0 0 1 1 0 0 1 0}
             a =  {9 9 9 9 9 9 9 9}
             b =  {1 2 3 4 5 6 7 8}
On Exit:    a =  {0 9 3 4 4 4 7 7}
```

Wrapping Propagate

In some embodiments, conditional recurrent bitwise copy operations may be performed using the Macroscalar instruction wapping propagate (WProp). As with the previously described instructions, the WProp instruction may have the A and B variants. The variants are:

Vec WPropA(PredV gp, Vec src1, Vec src2, PredV p)
Vec WPropE(PredV gp, Vec src1, Vec src2; PredV p)

One embodiment of a WPropA instruction is shown in code example 9. In this embodiment, using a first active element from input vector src1 as a basis, the WPropA instruction performs a recurrent bitwise copy using the basis and active elements from input vector src2. It is noted that code example 1 depicts the various element positions of the input vectors being processed in a sequential fashion, in other embodiments, the element positions may be processed in parallel.

Example 9

Program Code WPropA

```
Vec WPropA(PredV gp, Vec src1, Vec src2, PredV p)
{
    Vector r;
    int x;
    Scalar<F/U><32/64> s,t;
    s = src1.v[VECLEN-1];
    for(x=0;x<VECLEN;++x)
    {
        if(x)
            s = src1.v[x] ;
        if(gp.v[x])
            break;
        r.v[x] = src1.v[x];
    }
    for(; x<VECLEN; ++x)
    {
        r.v[x] = s;
        t = src2.v[x];
        if(gp.v[x] && p.v[x])
            s = t;
    }
    return(r);
}
```

An example of the WPropA instruction operating with wrapping is shown in execution example 10. Portions of the execution the WProp instruction, such as, e.g., the selection of the basis, are similar to portions of the execution of other wrapping instructions, such as a wrapping add operation, for example. In the case of the WPropA, however, the operation performed is a bitwise copy using the basis and active elements of operand vector src2, as opposed to arithmetic addition.

Example 10

Execution of WPropA with Wrapping

```
a = WPropA(gp,a,b,p);
On Entry:  gp = {1 1 0 1 1 1 0 0}
           p =  {1 1 0 0 1 1 1 0}
           a =  {1 2 3 4 5 6 7 8}
           b =  {2 3 2 3 2 3 2 3}
On Exit:   a =  {8 2 3 3 3 2 3 3}
```

An example of the WPropA instruction without wrapping is illustrated in code example 11. The illustrated embodiment operates in a similar fashion to the WPropA instruction with wrapping as described above in reference to execution example 10. In the non-wrapping case, predicate gp and predicate p are both 0 at element position one which indicates that element position one of input vector a is not an active element and, therefore, is not selected as the basis for the operation. The first active element is found at element position two where predicate gp is 1, resulting in the value of input vector a (2) being selected as the basis. The remaining portion of the execution of the WPropA instruction without wrapping then proceeds as described above in reference to the WPropA instruction with wrapping.

Example 11

Execution of WPropA without Wrapping

```
a = WPropA(gp,a,b,p);
On Entry:  gp = {0 1 0 1 1 1 1 1}
           p =  {0 0 1 0 1 1 1 1}
           a =  {1 2 3 4 5 6 7 8}
           b =  {2 3 2 3 2 3 2 3}
On Exit:   a =  {1 2 2 2 2 2 3 2}
```

An embodiment of the WPropB instruction is illustrated in code example 12. The illustrated embodiment functions in a similar fashion to the WPropA instruction described above in reference to code example 9. In the case of the WPropB instruction, a bitwise copy is performed before the intermediate value s (e.g., the basis value) is stored in destination vector r.

Example 12

Program Code WPropB

```
Vec WPropB(PredV gp, Vec src1, Vec src2, PredV p)
{
    Vector r;
    int x;
    Scalar<F/U><32/64> s, t;
    s = src1.v[VECLEN-1];
    for(x=0;x<VECLEN;++x)
    {
        if(qp.v[x])
            break;
        r.v[x] = src1.v[x];
        s = src1.v[x];
    }
    for(; x<VECLEN; ++x)
    {
        t = src2.v[x];
        if(gp.v[x] && p.v[x])
            s = t;
        r.v[x] = s;
    }
    return(r);
}
```

An example of the WPropB instruction with wrapping is shown in execution example 13. The execution of the WPropB instruction with wrapping is similar to the execution of the WPropA instruction with wrapping as described above in reference to execution example 10. In the case of the B variant of the WProp instruction, the bitwise copy is performed before the intermediate value s (e.g., the basis value) is copied into destination vector r.

Example 13

Execution of WPropB with Wrapping

```
a = WPropB(gp,a,b,p);
On Entry:  gp = {1 1 0 1 1 1 0 0}
            p = {1 1 0 0 1 1 1 0}
            a = {1 2 3 4 5 6 7 8}
            b = {2 3 2 3 2 3 2 3}
On Exit:    a = {2 3 3 3 2 3 3 3}
```

An example of the WPropB instruction without wrapping is shown in execution example 14. The execution of the WPropB instruction without wrapping is similar to the execution of the WPropB with wrapping as described above in reference to execution example 13. In the non-wrapping case, predicate gp and predicate p are both 0 at element position one. The predicate gp is 1 at element position two, resulting in the selection of the value of input vector a (1) at the preceding element position, i.e., element position one, as the basis. The remaining portion of the execution of the WPropB instruction without wrapping then proceeds as described above in reference to the WPropB instruction with wrapping.

Example 14

Execution of WPropB without Wrapping

```
a = WPropB(gp,a,b,p);
On Entry:  gp = {0 1 0 1 1 1 1 1}
            p = {0 0 1 0 1 1 1 1}
            a = {1 2 3 4 5 6 7 8}
            b = {2 3 2 3 2 3 2 3}
On Exit:    a = {1 2 2 2 2 3 2 3}
```

General features of the operation of the WPropA and WPropB instructions may be summarized as follows. For the B variant, basis selection generally involves selecting the basis value from an element position of the basis vector corresponding to an element position that immediately precedes the first active element position of the selection vector. In the case that the first active element position of the selection vector is the first element position, the basis value may be selected from the last element position of the basis vector. For the A variant, basis selection generally involves selecting the basis value from an element position of the basis vector corresponding to the first active element position of the selection vector (as opposed to the position that immediately precedes the first active element position of the selection vector). For either variant, if the first active element position of the selection vector is the first element position, the basis value may be selected from the last element position of the basis vector.

The copy operation that generates the result vector may be understood to encompass several different cases depending on the state of the control and selection vectors. For example, generating the result vector may include copying one or more elements of the basis vector (e.g., src1) into one or more element positions of the result vector for which corresponding element positions of the selection vector (e.g., gp) are inactive. In other words, for inactive element positions of the selection vector, corresponding elements of the basis vector src1 may be copied to the result. In some embodiments, this case may apply to inactive element positions of the selection vector that occur prior to the first active element position of the selection vector, and inactive elements subsequent to the first active element position of the selection vector may be treated differently. For example, in some such embodiments, for a given element position of the result vector that both (a) corresponds to a position subsequent to the first active element position of the selection vector, and (b) for which a corresponding element of either the selection vector or the control vector is inactive, the basis value may be copied to the given element position of the result vector. (A possible distinction between the two copying scenarios just described may be understood by noting for a given element position N of the result vector, the basis value may differ from the value at position N of the basis vector.)

For element positions of the result vector for which corresponding element positions of both the selection vector and the control vector are active, generating the result vector may include copying one or more values of the operand vector (e.g., src2) into such element positions of the result vector. In particular, for the WPropA instruction, for a given element position of the result vector for which corresponding element positions of both the selection vector and the control vector are active, generating the result vector may include setting the given position of the result vector to an element of the operand vector at a position that immediately precedes the given element position of the result vector.

When the selection vector and control vector are both active at a given element position, the basis value may also be updated. In an embodiment of the WPropA instruction, the basis value may be updated in this case by setting the basis value to an element of the operand vector that immediately precedes the corresponding given element position of the operand vector (e.g., src2). In an embodiment of the WPropB instruction, the basis value may be updated in this case by setting the basis value to an element of the operand vector at the corresponding given element position of the operand vector (as opposed to immediately preceding the given element position).

The operation of embodiments of the WPropA and WPropB instructions may also be understood from the perspective of a given element position of the result vector by querying the state of the selection and/or the control vector relative to the given element position. For example, consider the case of an embodiment of WPropB for a given element position of the result vector, a corresponding given element position of the selection vector, and a corresponding given element position of the control vector. (Generally speaking, the correspondence among positions is one of identical relative position within the respective vectors—i.e., in which the given element position is the same position N within each vector.) For the given element position, the following cases for generating an element of the result vector may apply:

Dependent upon determining that all element positions of the selection vector prior to or including the given element position of the selection vector are inactive, copy a corresponding element of the basis vector to the given element position of the result vector.

Dependent upon determining that:
  a) Any element position of the selection vector prior to or including the given element position is active; and
  b) The given element position of the control vector is inactive; and
  c) For no element positions prior to the given element position are the selection vector and the control vector both active;

Set the given element position of the result vector to a value of the basis vector at a closest prior element position relative to the given element position for which the selection vector is inactive. (Phrased differently, in the event that there are multiple element positions prior to the given element position at which the selection vector e.g., gp—is inactive, this case may be understood to assign the output to the one of these that is "closest to" the given element position, regardless of how many intervening elements separate the given position and the closest prior element position.)

Dependent upon determining that:
  a) The given element position of the control vector or the selection vector is inactive; and
  b) For at least one element position prior to the given element position, the selection vector and the control vector are both active;

Set the given element position of the result vector to a value of the operand vector at a closest prior element position relative to the given element position for which the selection vector and the control vector are both active. (The semantics of "closest prior element position" for this event may be understood to be similar to those in the previous section, though dependent on a differently defined condition.)

Dependent upon determining that the selection vector and the control vector are both active at the given element position, copy a corresponding element of the operand vector to the given element position of the result vector.

Similarly, for the given element position, the following cases for generating an element of the result vector according to an embodiment of the WPropA instruction may apply:

Dependent upon determining that all element positions of the selection vector prior to the given element position of the selection vector are inactive, copy a corresponding element of the basis vector to the given element position of the result vector.

Dependent upon determining that:
  a) Any element position of the selection vector prior to the given element position is active; and
  b) The given element position of the control vector is inactive, or the given element position of the control vector and the selection vector are both active; and
  c) For no element positions prior to the given element position are the selection vector and the control vector both active;

Set the given element position of the result vector to a value of the basis vector at a first element position for which the selection vector is active.

Dependent upon determining that:
  a) The given element position of the control vector or the selection vector is inactive; and
  b) For at least one element position prior to the given element position, the selection vector and the control vector are both active;

Set the given element position of the result vector to a value of the operand vector at a closest prior element position relative to the given element position for which the selection vector and the control vector are both active. (The semantics of "closest prior element position" for this event may be understood to be similar to those discussed above with respect to WPropB.)

Dependent upon determining that the selection vector and the control vector are both active at the given element position and are both active at any element position prior to the given element position, copy an element of the operand vector immediately prior to the given element position of the operand vector to the given element position of the result vector.

Figure 9:
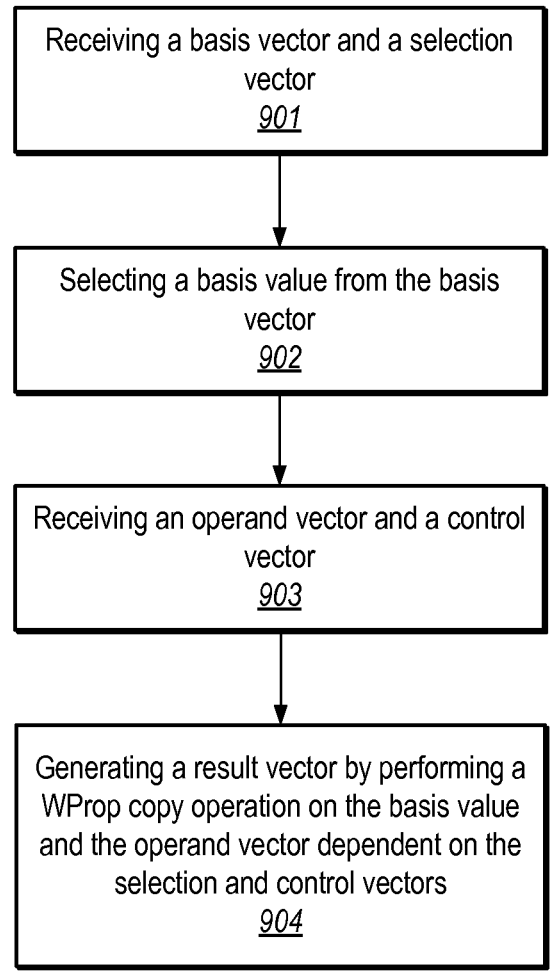
FIG. 9 is a flow diagram depicting the operation of one embodiment of the processor of FIG. 2 during execution of program instructions that implement a wrapping propagate operation.

In FIG. 9 a flow diagram depicting the operation of one embodiment of the processor of FIG. 2 during execution of program instructions that implement a running or wrapping copy operation is shown. Referring collectively to FIG. 1, FIG. 2, and Examples 6-14, and beginning in block 901 of FIG. 9, processor 102 may receive a basis vector (e.g., vector src1 of code example 9) and a selection vector (e.g., vector gp of code example 9). In some embodiments, the basis vector and the selection vector may be received from L1 cache 104 or L2 cache 106, while in other embodiments, the vectors may reside in memory 108 or mass storage device 110.

A basis value may then be selected from the basis vector (block 902). In some embodiments, selecting the basis value may be performed dependent upon evaluating the selection vector to identify the first active element position of the selection vector. For example, as described above in reference to the WPropB instruction, the first active element of the input vector is selected as the basis value unless the first active element is in the first element position. In some embodiments, when the first active element is in the first element position, the basis value may be selected from the last element position of the input vector. (In some embodiments, selection of the basis value may be dependent upon both the selection vector and the control vector described below.)

Processor 102 may also receive an operand vector and a control vector, such as, e.g., vectors src2 and p of code example 9 (block 903). As described above, processor 102 may receive these vectors from L1 cache 104, L2 cache 106, memory 108, or mass storage device 110. In some embodiments, the operand vector and/or control vector may be received concurrently with other inputs to instruction execution (e.g., the basis and selection vectors) or in any other suitable order. It is noted that the basis and operand vectors for any instruction may be generally considered to be input vectors, and may be referred to as such.

A result vector (e.g., vector r of code example 9) may then be generated by performing a WProp copy operation using the basis value and the operand vector dependent upon the selection and control vectors (block 904). The WProp copy operation may be performed according to the code examples and/or operational cases discussed above for WPropA or WPropB. In some embodiments, performing the copy operation may include, for element positions including or subsequent to the first active element position of the selection vector, conditionally updating the basis value from the operand vector dependent on the control vector, and updating the result vector dependent upon the basis value. Further, in some embodiments, generating the result vector may include copying one or more elements of the basis vector into the result vector dependent upon the first active element position of the selection vector. It is noted that the flow diagram depicted in FIG. 9 is merely an example and that additional operations and/or a different order of operations are possible and contemplated.

Shift In Right

In some embodiments, shift or propagate operations may be implemented using instructions in the Macroscalar architecture. More particularly, as described further below, shift in right (ShInRight) may be implemented.

Example 15

Program Code ShInRight

```
Vec ShInRight(Vec dst, PredV gp, unsigned src1, Vec src2,
PredV p)
{
    Vector r;
    int x;
    int y;
    for(x=0;x<VECLEN;++x)
    {
        if(gp.v[x])
            break;
        else
            r.v[x] = dst.v[x];
    }
    if(x < VECLEN)
    {
        r.v[y=x] = src1;
        for(++x; x<VECLEN; ++x)
        {
            if(gp.v[x] && p.v[x-1])
                r.v[x] = src2.v[(y=x)-1];
            else if(gp.v[x])
                r.v[x] = r.v[y];
            else
                r.v[x] = dst.v[x];
        }
    }
    return(r);
}
```

An example of the ShInRight instruction operating with predication is shown below in execution example 16. Referring collectively to code example 15 and execution example 16, at element position one, predicate gp and predicate p are both 0, resulting in the value of at element position one of input vector a (1) being copied to element position one of the destination vector r. Moving to element position two, predicate gp remains 0, while predicate p is 1, resulting in the value at element position two of input vector a (2) being copies to element position two of destination vector r.

Turning to element position three, both predicate gp and predicate p are 1, denoting the first active element, which results in the value of scalar j (9) being copied into element position three of destination vector r. At element position four, both predicate vectors, gp and p, are 1 resulting in the value at element position three of input vector a (3) being copied into element position four of destination vector r.

Moving to element position five, predicate gp is 1 and predicate p is 0. This combination of predicate vector values results in the value of input vector a at the last previous active element position, being copied into destination vector r. More specifically, in this case, the value at element position four of input vector a (4) is copied into element position five of destination vector r.

Example 16

Execution of ShInRight with Predication

```
a = ShInRight(a,gp,j,a,p);
On Entry:  gp = {0 0 1 1 1 1 1 1}
           p =  {0 1 1 1 0 0 1 1}
           a =  {1 2 3 4 5 6 7 8}
           j =  9
On Exit:   a =  {1 2 9 3 4 4 4 7}
```

An example of the ShInRight instruction operating with zeroing is shown below in execution example 17. The execution with zeroing is similar to the execution with predication as described above in reference to execution example 16. When functioning in zeroing mode, however, the ShInRight instruction copies a zero into the element position of destination vector r corresponding to element positions of predicate gp that contain a 0 value. For example, at element position one of execution example 17, the predicate gp is 0, resulting in a 0 being stored in element position one of destination vector r.

Example 17

Execution of ShInRight with Zeroing

```
a = ShInRight(a,gp,j,a,p);
On Entry:  gp = {0 0 1 1 1 1 1 1}
           p =  {0 1 1 1 0 0 1 1}
           a =  {1 2 3 4 5 6 7 8}
           j =  9
On Exit:   a =  {0 0 9 3 4 4 4 7}
```

Wrapping Rotate Previous

The Macroscalar instruction wrapping rotate previous (WRotPrev) conditionally rotates elements of a second input vector to the right dependent upon the state of the predicate vectors, and stores the result in a destination vector. In the case of element positions that do not contain an active element in the second input vector, a corresponding element from a first input vector is copied into the destination vector. In some embodiments, the first input vector may also be used as the destination vector. One embodiment of a WRotPrev instruction is shown in code example 18.

Example 18

Program Code WRotPrev

```
Vec WRotPrev(PredV gp, Vec src1, Vec src2, PredV p)
{
    Vector r;
    int x;
    Scalar<F/U><32/64> s;
    Scalar<F/U><32/64> t;
    s = src1.v[VECLEN-1];
    t = s
    for(x=0;x<VECLEN;++x)
    {
        if(gp.v[x])
            break;
        s = src1.v[x];
        r.v[x] = src1.v[x];
        t = src2.v[x];
    }
    for(; x<VECLEN; ++x)
    {
        if(gp.v[x] && p.v[x])
            s = t;
```

-continued

```
        r.v[x] = s;
        t = src2.v[x];
    }
    return(r);
}
```

An example of the WRotPrev instruction operating with wrapping is shown in execution example 19. Referring collectively to code example 18 and execution example 19, the execution of the instructions begins by setting intermediate value s (e.g., the basis value) and intermediate value t equal to the value at the last element position of input vector a (8). At element position one, predicate gp and predicate p are both 1, resulting in intermediate value s being copied into element position one of destination vector r, and the value at element position one of input vector b being copied into intermediate value t.

Example 19

Execution of WRotPrev with Wrapping

```
a = WRotPrev(gp,a,b,p);
On Entry:  gp =  {1 1 0 1 1 1 1 1}
           p =   {1 1 0 0 1 1 1 1}
           a =   {1 2 3 4 5 6 7 8}
           b =   {9 10 11 12 13 14 15 16}
On Exit:   a =   {8 9 9 9 12 13 14 15}
```

An example of the WRotPrev instruction without wrapping is illustrated in code example 20. The illustrated embodiment operates in a similar fashion to the WRotPrev instruction with wrapping as described above in reference to execution example 19. In the non-wrapping case, predicate gp and predicate p are both 0 at element position one which indicates that element position one of input vector a is not an active element, resulting in the value at element position one of input vector a (1) being copied into element position one of destination vector r. The first active element is found at element position two where predicate gp is 1. The remaining portion of the execution of the WRotPrev instruction without wrapping then proceeds as described above in reference to the WRotPrev instruction with wrapping.

Example 20

Execution of WRotPrev without Wrapping

```
a = WRotPrev(gp,a,b,p);
On Entry:  gp =  {0 1 0 1 1 1 1 1}
           p =   {0 0 1 0 1 1 1 1}
           a =   {1 2 3 4 5 6 7 8}
           b =   {9 10 11 12 13 14 15 16}
On Exit:   a =   {1 1 1 1 12 13 14 15}
```

Like WPropA and WPropB above, the operation of an embodiment of the WRotPrev instructions may also be understood from the perspective of a given element position of the result vector by querying the state of the selection and/or the control vector relative to the given element position. For example, consider the case of an embodiment of WRotPrev for a given element position of the result vector, a corresponding given element position of the selection vector, and a corresponding given element position of the control vector. For the given element position, the following cases for generating an element of the result vector may apply:

Dependent upon determining that the selection vector and the control vector are both inactive at the given element position and are not both active at any element position prior to the given element position (i.e., are both active at no element position prior to the given element position), copy an element of the basis vector at the given element position to the given element position of the result vector.

Dependent upon determining that:
  a) The selection vector is active at the given element position; and
  b) The given element position of the control vector is inactive; and
  c) For no element positions prior to the given element position are the selection vector and the control vector both active;
Set the given element position of the result vector to a value of the basis vector at a closest prior element position relative to the given element position for which the selection vector and the control vector are both inactive.

Dependent upon determining that:
  a) The given element position of the control vector or the selection vector is inactive; and
  b) For at least one element position prior to the given element position, the selection vector and the control vector are both active;
Set the given element position of the result vector to a value of the operand vector at a position immediately prior to a closest prior element position relative to the given element position for which the selection vector and the control vector are both active, (That is, this event involves selection of a value that is one position prior to a "closest prior element position," the latter term having similar semantics to the WPropA and WPropB cases discussed above.)

Dependent upon determining that the selection vector and the control vector are both active at the given element position, set the given element position of the result vector to an element of the operand vector immediately preceding the given element position of the result vector.

Figure 10:
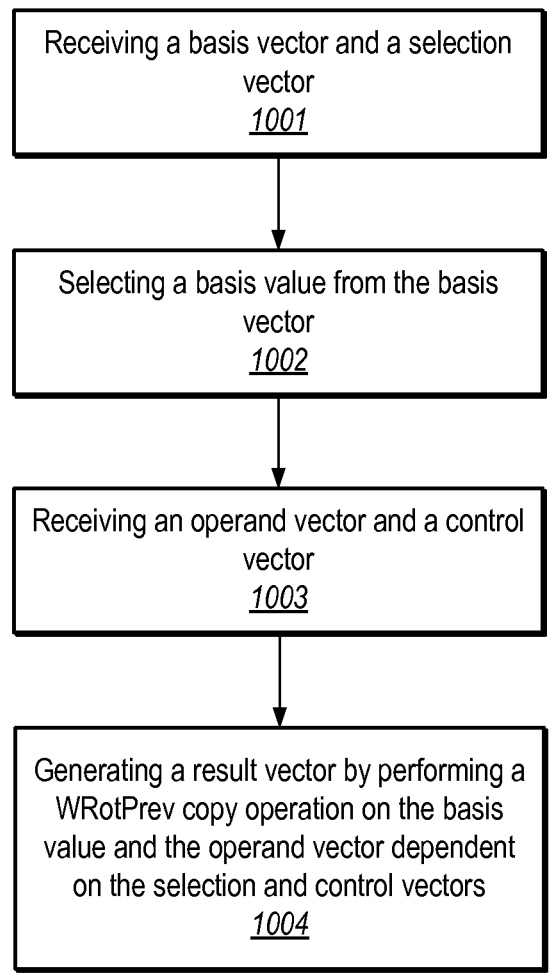
FIG. 10 is a flow diagram depicting the operation of one embodiment of the processor of FIG. 2 during execution of program instructions that implement a wrapping rotate previous operation.

In FIG. 10 a flow diagram depicting the operation of one embodiment of the processor of FIG. 2 during execution of program instructions that implement a wrapping propagate operation is shown. Referring collectively to FIG. 1, FIG. 2, and Examples 15-20, and beginning in block 1001 of FIG. 10, processor 102 may receive a basis vector (e.g., vector src1 of code example 18) and a selection vector (e.g., vector gp of code example 18). In some embodiments, the basis vector and the selection vector may be received from L1 cache 104 or L2 cache 106, while in other embodiments, the vectors may reside in memory 108 or mass storage device 110.

A basis value may then be selected from the basis vector (block 1002). For example, as described above in reference to the WRotPrev instruction, the first active element of the input vector is selected as the basis value unless the first active element is in the first element position. In some embodiments, when the first active element is in the first element position, the basis value may be selected from the last element position of the input vector.

Processor 102 may also receive an operand vector and a control vector, such as, e.g., vectors src2 and p of code example 18 (block 1003). As described above, processor 102 may receive the second input vector from L2 cache 106, memory 108, or mass storage device 110. In some embodiments, the operand vector and/or control vector may be received concurrently with other inputs to instruction execution (e.g., the basis and selection vectors) or in any other suitable order.

A result vector (e.g., vector r of code example 18) may then be generated by performing a WRotPrev copy operation using the basis value and the operand vector dependent upon the selection and control vector (block 1004). The WRotPrev copy operation may be performed according to the code examples and/or the operational cases discussed above. It is noted that the flow diagram depicted in FIG. 10 is merely an example and that additional operations and/or a different order of operations are possible and contemplated.

Execution example 21 illustrates the results of each of the WPropA, WPropB, and WRotPrev instructions given the same selection vector, control vector, basis vector, and operand vector inputs. The juxtaposition of the results of these instructions illustrates that although each instruction involves the copying of various input elements to the result vector, the results differ according to the differing semantics of each instruction.

Example 21

Comparative Execution of WPropA, WPropB, and WRotPrev on Identical Input Values

```
a = WRotPrev(gp,a,b,p);
On Entry:
gp =   { 0    0    0    1    1    1    1    1    1    1    1    1    0    0}
p =    { 0    0    0    0    0    0    1    1    1    0    0    0    0    0}
a =    {A1   A2   A3   A4   A5   A6   A7   A8   A9   A10  A11  A12  A13  A14}
b =    {B1   B2   B3   B4   B5   B6   B7   B8   B9   B10  B11  B12  B13  B14}
On Exit:
WPropA(gp,a,b,p):
a =    {A1   A2   A3   A4   A4   A4   A4   B7   B8   B9   B9   B9   B9   B9}
WPropB(gp,a,b,p):
a =    {A1   A2   A3   A3   A3   A3   B7   B8   B9   B9   B9   B9   B9   B9}
WRotPrev(gp,a,b,p}:
a =    {A1   A2   A3   A3   A3   A3   B6   B7   B8   B8   B8   B8   B8   B8}
```

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
one or more processor cores, wherein to execute a particular instruction, a given one of the one or more processor cores is configured to:
receive an operand vector, a basis vector, a selection vector, and a control vector;
evaluate the selection vector to identify a first active element position of the selection vector;
select an element of the basis vector as a basis value dependent upon the first active element position; and
generate a result vector dependent upon the basis value;
wherein each of the operand vector, the basis vector, the selection vector, the control vector, and the result vector respectively includes a set of N elements that occupy N ordered element positions;
wherein for a given element position of the result vector, a corresponding given element position of the selection vector, and a corresponding given element position of the control vector, to generate the result vector, the given processor core is further configured to:
in response to a determination that both the selection vector and the control vector are active at the given element position, set the basis value and the given element position of the result vector to an element of the operand vector immediately preceding the given element position of the result vector.

2. The processor of claim 1, wherein to generate the result vector, the given processor core is further configured to:
dependent upon a determination that the selection vector and the control vector are both inactive at the given element position and are both active at no element position prior to the given element position, copy an element of the basis vector at the given element position to the given element position of the result vector.

3. The processor of claim 1, wherein to generate the result vector, the given processor core is further configured to:
dependent upon a determination that the given element position of the control vector or the selection vector is inactive, and that for at least one element position prior to the given element position, the selection vector and the control vector are both active, set the given element position of the result vector to a value of the operand vector at a position immediately prior to a closest prior element position relative to the given element position for which the selection vector and the control vector are both active.

4. The processor of claim 1, wherein to generate the result vector, the given processor core is further configured to:
dependent upon a determination that the selection vector is active at the given element position, that the given element position of the control vector is inactive, and that for no element positions prior to the given element position are the selection vector and the control vector both active, set the given element position of the result vector to a value of the basis vector at a closest prior element position relative to the given element position for which the selection vector and the control vector are both inactive.

5. The processor of claim 1, wherein to select an element of the basis vector as the basis value, the given processor core is further configured to select the basis value from an element position of the basis vector corresponding to an element position immediately preceding the first active element position of the selection vector.

6. The processor of claim 1, wherein to select an element of the basis vector as the basis value, the given processor core is further configured to select the basis value from a last element position of the basis vector in response to a determination that the first active element position of the selection vector is the first element position of the selection vector.

7. A method, comprising:
performing, by a processor:
receiving a first instance of a Macroscalar Wrapping Rotate Previous instruction, the first instance specifying at least an operand vector, a basis vector, a selection vector, and a control vector, each corresponding to the first instance, wherein each of the operand vector, the basis vector, the selection vector, and the control vector corresponding to the first instance respectively includes a set of N elements that occupy N ordered element positions;
evaluating the selection vector for the first instance to identify a first active element position of the selection vector for the first instance;
selecting an element of the basis vector for the first instance as a basis value dependent upon the first active element position; and
generating a result vector for the first instance, the result vector for the first instance including a set of N elements that occupy N ordered element positions;
wherein for a given element position of the result vector for the first instance, a corresponding given element position of the selection vector for the first instance, and a corresponding given element position of the control vector for the first instance, generating the result vector for the first instance comprises:
setting the given element position of the result vector for the first instance to an element of the operand vector for the first instance immediately preceding the given element position of the result vector for the first instance in response to a determination that both the selection vector for the first instance and the control vector for the first instance are active at the given element position.

8. The method of claim 7, wherein the performing further comprises:
receiving a second instance of a Macroscalar Wrapping Rotate Previous instruction, the second instance specifying at least an operand vector, a basis vector, a selection vector, and a control vector, each corresponding to the second instance, wherein each of the operand vector, the basis vector, the selection vector, and the control vector corresponding to the second instance respectively includes a set of N elements that occupy N ordered element positions; and
generating a result vector for the second instance, the result vector for the second instance including a set of N elements that occupy N ordered element positions;
wherein for a given element position of the result vector for the second instance, a corresponding given element position of the selection vector for the second instance, and a corresponding given element position of the control vector for the second instance, generating the result vector for the second instance comprises:
dependent upon a determination that the selection vector for the second instance and the control vector for the second instance are both inactive at the given element position and are both active at no element position prior to the given element position, copying an element of the basis vector for the second instance at the given element position to the given element position of the result vector for the second instance.

9. The method of claim 7, wherein the performing further comprises:
receiving a third instance of a Macroscalar Wrapping Rotate Previous instruction, the third instance specifying at least an operand vector, a selection vector, and a control vector, each corresponding to the third instance, wherein each of the operand vector, the selection vector, and the control vector corresponding to the third instance respectively includes a set of N elements that occupy N ordered element positions; and
generating a result vector for the third instance, the result vector for the third instance including a set of N elements that occupy N ordered element positions;
wherein for a given element position of the result vector for the third instance, a corresponding given element position of the selection vector for the third instance, and a corresponding given element position of the control vector for the third instance, generating the result vector for the third instance comprises:
dependent upon a determination that the given element position of the control vector for the third instance or the selection vector for the third instance is inactive, and that for at least one element position prior to the given element position, the selection vector for the third instance and the control vector for the third instance are both active, set the given element position of the result vector for the third instance to a value of the operand vector for the third instance at a position immediately prior to a closest prior element position relative to the given element position for which the selection vector for the third instance and the control vector for the third instance are both active.

10. The method of claim 7, wherein the performing further comprises:
receiving a fourth instance of a Macroscalar Wrapping Rotate Previous instruction, the fourth instance specifying at least an operand vector, a basis vector, a selection vector, and a control vector, each corresponding to the fourth instance, wherein each of the operand vector, the basis vector, the selection vector, and the control vector corresponding to the fourth instance respectively includes a set of N elements that occupy N ordered element positions; and
generating a result vector for the fourth instance, the result vector for the fourth instance including a set of N elements that occupy N ordered element positions;
wherein for a given element position of the result vector for the fourth instance, a corresponding given element position of the selection vector for the fourth instance, and a corresponding given element position of the control vector for the fourth instance, generating the result vector for the fourth instance comprises:
dependent upon a determination that the selection vector for the fourth instance is active at the given element position, that the given element position of the control vector for the fourth instance is inactive, and that for no element positions prior to the given element position are the selection vector for the fourth instance and the control vector for the fourth instance both active, set the given element position of the result vector for the fourth instance to a value of the basis vector for the fourth instance at a closest prior element position relative to the given element position for which the selection vector for the fourth instance and the control vector for the fourth instance are both inactive.

11. The method of claim 7, wherein selecting an element of the basis vector for the first instance as the basis value comprises selecting the basis value from an element position of the basis vector for the first instance corresponding to an element position immediately preceding the first active element position of the selection vector for the first instance.

12. The method of claim 7, wherein selecting an element of the basis vector for the first instance as the basis value comprises selecting the basis value from a last element position of the basis vector for the first instance in response to a determination that the first active element position of the selection vector for the first instance is the first element position of the selection vector for the first instance.

13. A system, comprising:
one or more memories; and
one or more processors coupled to the one or more memories, wherein to execute a particular instruction, a given one of the one or more processors is configured to:
receive an operand vector, a basis vector, a selection vector, and a control vector;
evaluate the selection vector to identify a first active element position of the selection vector;
select an element of the basis vector as a basis value dependent upon the first active element position; and
generate a result vector dependent upon the basis value;
wherein each of the operand vector, the basis vector, the selection vector, the control vector, and the result vector respectively includes a set of N elements that occupy N ordered element positions;
wherein for a given element position of the result vector, a corresponding given element position of the selection vector, and a corresponding given element position of the control vector, to generate the result vector, the given processor is further configured to:
in response to a determination that both the selection vector and the control vector are active at the given element position, set the basis value and the given element position of the result vector to an element of the operand vector immediately preceding the given element position of the result vector.

14. The system of claim 13, wherein to generate the result vector, the given processor is further configured to:
dependent upon a determination that the selection vector and the control vector are both inactive at the given element position and are both active at no element position prior to the given element position, copy an element of the basis vector at the given element position to the given element position of the result vector.

15. The system of claim 13, wherein to generate the result vector, the given processor is further configured to:
dependent upon a determination that the given element position of the control vector or the selection vector is inactive, and that for at least one element position prior to the given element position, the selection vector and the control vector are both active, set the given element position of the result vector to a value of the operand vector at a position immediately prior to a closest prior element position relative to the given element position for which the selection vector and the control vector are both active.

16. The system of claim 13, wherein to generate the result vector, the given processor is further configured to:
dependent upon a determination that the selection vector is active at the given element position, that the given element position of the control vector is inactive, and that for no element positions prior to the given element position are the selection vector and the control vector both active, set the given element position of the result vector to a value of the basis vector at a closest prior element position relative to the given element position for which the selection vector and the control vector are both inactive.

17. The system of claim 13, wherein to select an element of the basis vector as the basis value, the given processor is further configured to select the basis value from an element position of the basis vector corresponding to an element position immediately preceding the first active element position of the selection vector.

18. The system of claim 13, wherein to select an element of the basis vector as the basis value, the given processor is further configured to select the basis value from a last element position of the basis vector in response to a determination that the first active element position of the selection vector is the first element position of the selection vector.

* * * * *